United States Patent [19]
Sumi et al.

[11] Patent Number: 5,490,167
[45] Date of Patent: Feb. 6, 1996

[54] DUPLEX VOICE COMMUNICATION RADIO TRANSMITTER-RECEIVER

[75] Inventors: Fujio Sumi; Susumu Nakabayashi, both of Tokyo; Sakari Ohira; Kouichi Ishikawa, both of Miyagi, all of Japan

[73] Assignees: Touhoku-Denryoku Kabushiki Kaisha, Miyagi; Fuji-Tekku Kabushiki Kaisha, Tokyo, both of Japan

[21] Appl. No.: 671,821

[22] PCT Filed: Aug. 8, 1990

[86] PCT No.: PCT/JP90/01014

§ 371 Date: Mar. 28, 1991

§ 102(e) Date: Mar. 28, 1991

[87] PCT Pub. No.: WO91/02414

PCT Pub. Date: Feb. 21, 1991

[30] Foreign Application Priority Data

Aug. 9, 1989 [JP] Japan ..................... 1-204870

[51] Int. Cl.⁶ .................. H04B 1/38; H04L 5/14
[52] U.S. Cl. .......... 375/219; 375/240; 375/364; 370/24; 370/109; 381/34
[58] Field of Search ..................... 375/107, 106, 375/7, 122, 259, 364, 295, 316, 340, 285, 354, 356, 240, 219, 254; 381/34; 455/53.1, 57.1, 49.1, 56.1, 55.1; 370/24, 109, 110.2, 110.3, 110.4

[56] References Cited

U.S. PATENT DOCUMENTS 4,893,339  1/1990  Bright et al. .................. 380/28
5,159,596  10/1992  Itoh .......................... 455/33.4
5,355,363  10/1994  Takahashi et al. ............... 370/109
5,396,484  3/1995  Itoh ........................... 370/109

FOREIGN PATENT DOCUMENTS

| 4864813 | 12/1971 | Japan . |
| 49-2417 | 1/1974 | Japan . |
| 50-41406 | 4/1975 | Japan . |
| 52-38809 | 3/1977 | Japan . |
| 52-45813 | 4/1977 | Japan . |
| 53-35411 | 4/1978 | Japan . |
| 60-57731 | 4/1985 | Japan . |
| 61-102830 | 5/1986 | Japan . |
| 63-127626 | 5/1988 | Japan . |
| 63-136835 | 6/1988 | Japan . |

Primary Examiner—Stephen Chin
Assistant Examiner—Tesfaldet Bocure
Attorney, Agent, or Firm—Sughrue, Mion, Zinn, Macpeak & Seas

[57] ABSTRACT

A duplex voice communication radio transmitter-receiver according to the present invention is provided with a low-pass filter arranged before a time compressing device in a transmitter section for cutting off a higher frequency portion of the band of a voice signal thus to decreasing the maximum modulation frequency of the same to less than a half so that it can be operated with the use of an assigned, single frequency transmission radio wave of which frequency band is legally limited, improved in the utilization of frequencies, minimized in the delay of communication signals, and enhanced in the articulation and intelligibility of a reproduced voice sound.

10 Claims, 14 Drawing Sheets

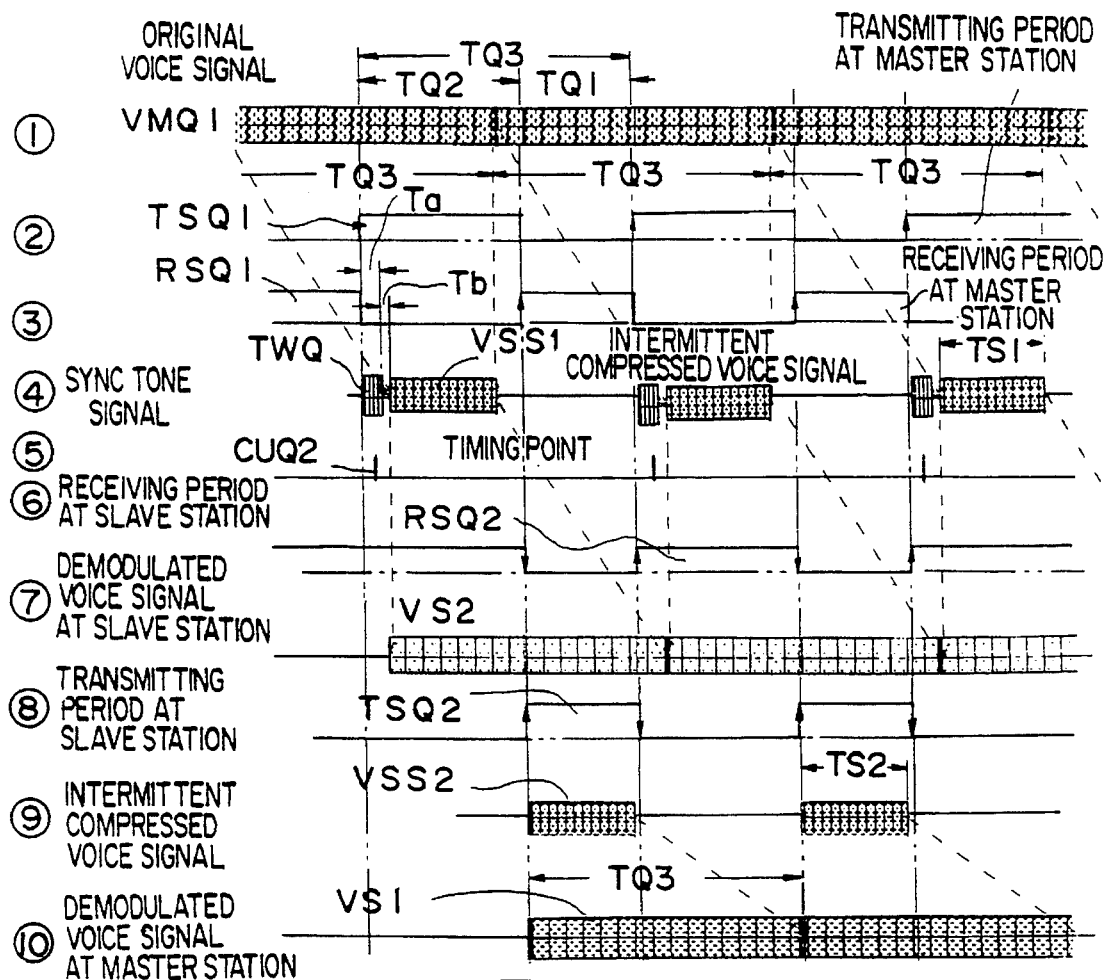
FIG. 1
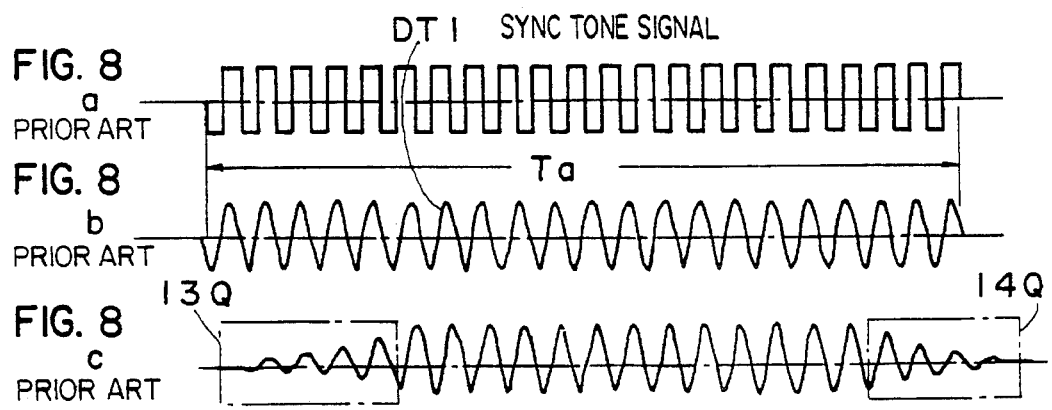
FIG. 8a PRIOR ART
FIG. 8b PRIOR ART
FIG. 8c PRIOR ART

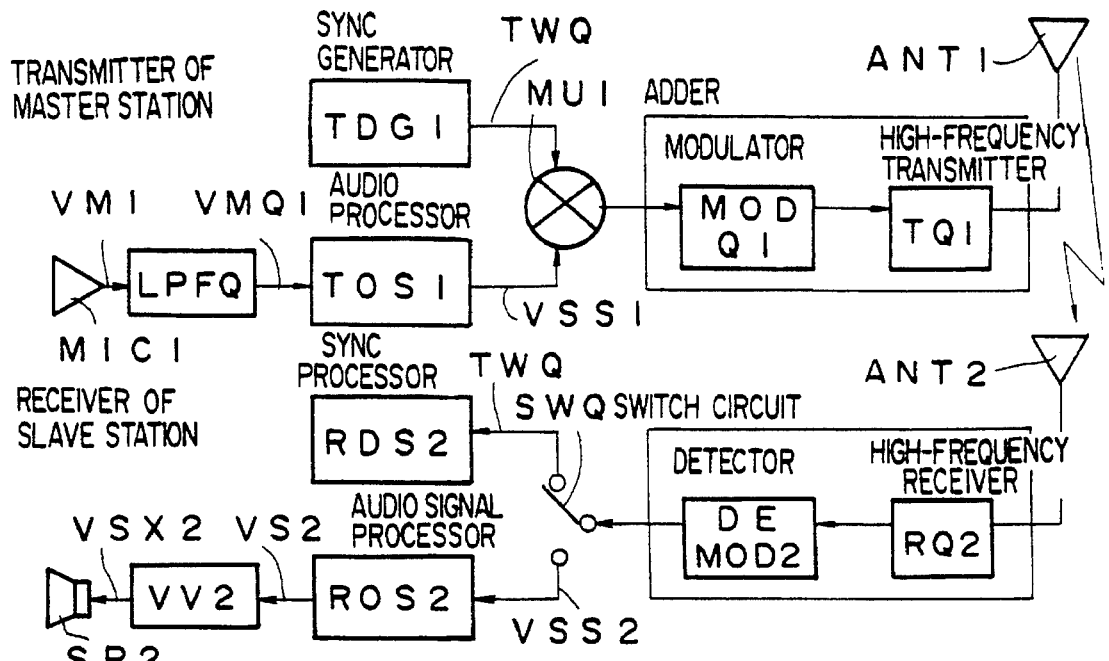
FIG. 2
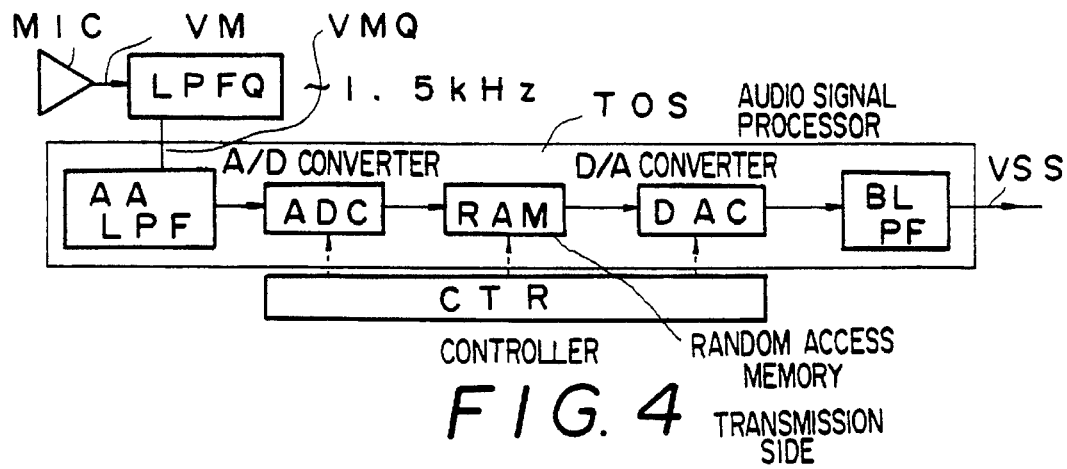
FIG. 4 TRANSMISSION SIDE
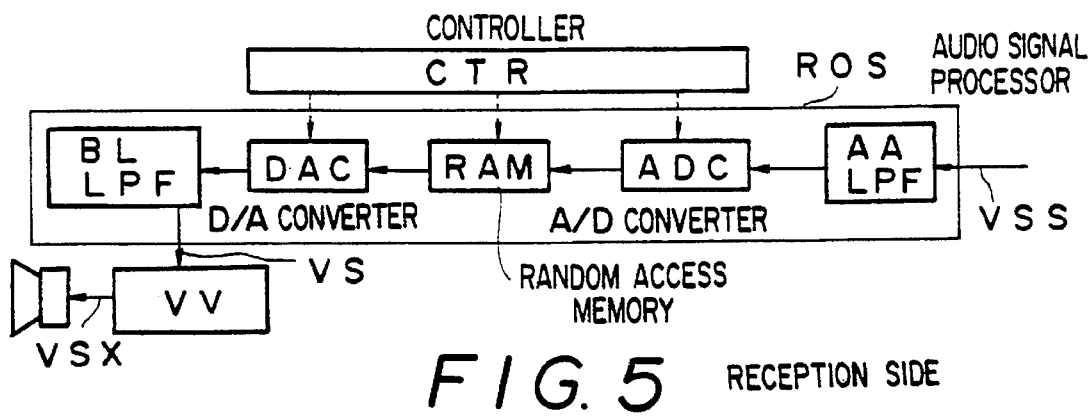
FIG. 5 RECEPTION SIDE

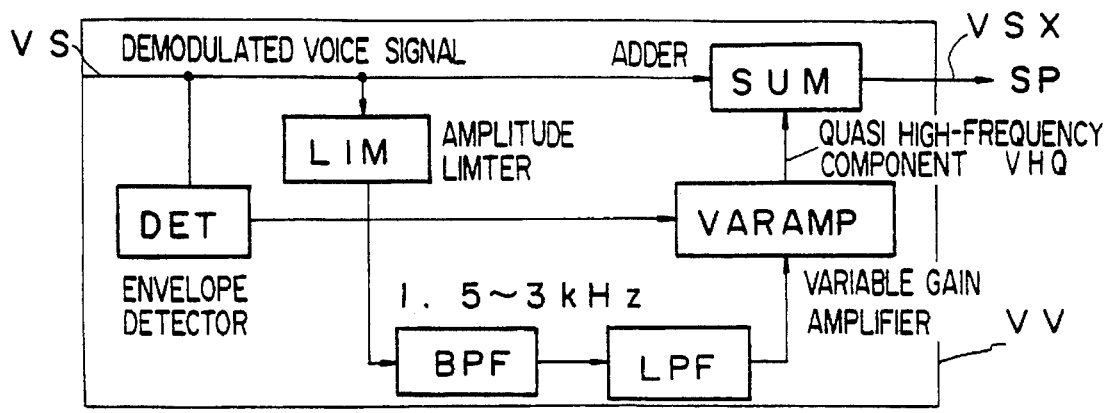
FIG. 6
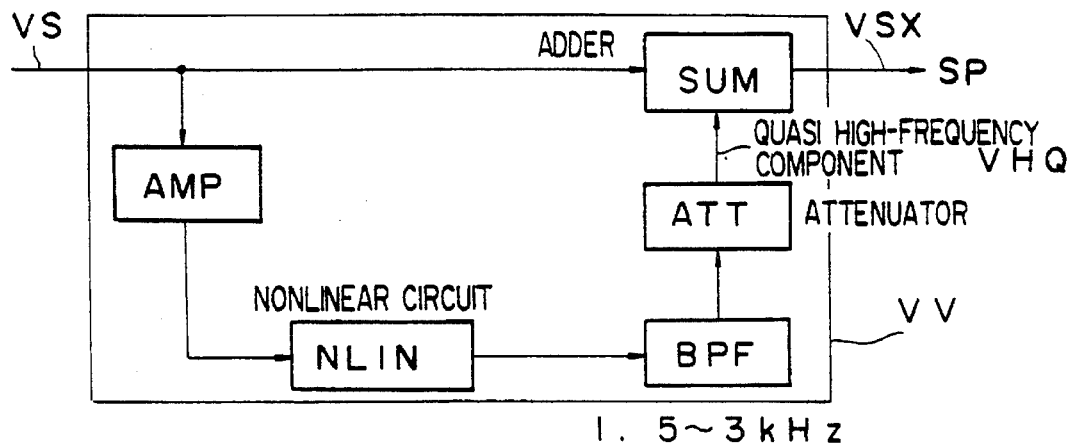
FIG. 7
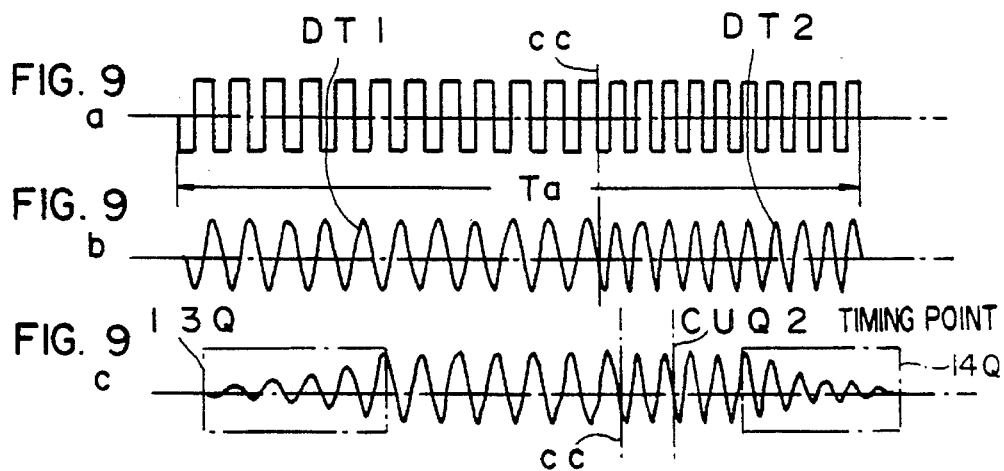

FIG. 23a FIELD STRENGTH / RECEPTION LIMIT LEVEL

FIG. 23b RECEPTION PERIOD / TRANSMISSION PERIOD / RECEPTION PERIOD

FIG. 23c RECEIVED NOISE

FIG. 23d DEMODULATED NOISE

FULL MESSAGE

| M | O | S | I | M | O | S | I | K | A | M | E | Y | O | | |

1/2 TIME COMPRESSION AT Fo<1Hz

1/2 TIME COMPRESSION AT 1Hz<Fo<10Hz

1/2 TIME COMPRESSION AT 10Hz<Fo

DUPLEX VOICE COMMUNICATION RADIO TRANSMITTER-RECEIVER

BACKGROUND OF THE INVENTION

The present invention relates to a duplex voice communication radio transmitter-receiver for transmission and reception of voice message with the use of radio waves having a single frequency or two adjacent frequencies.

It is known in common duplex operating radio communication that radio waves to be used should be of two sufficiently separated frequencies for stable and consistent transmission.

However, the duplex operation becomes possible with lower but acceptable effectiveness through the use of one frequency or two closely separated frequencies. FIG. 20 shows the schematic arrangement of "a narrow-band voice communication transmitter-receiver capable of simultaneously transmitting and receiving voice information with the use of radio waves of a single frequency".

As illustrated in FIG. 20, a couple of narrow-band voice transmitter-receiver B1 and B2 are identical in the construction employing one carrier frequency f for transmission and reception. Each transmitter-receiver contains a transmitter T, a receiver R, a control switch SW for selecting and activating either the transmitter or the receiver at intervals of a given time, a sync generator SYCGEN for controlling the intervals and synchronizing the control switch with a control switch of the other station, a loud-speaker SP, a microphone MIC, and an antenna coupler AT. Also, denoted by ANT is an antenna. (In FIG. 20, like components in the transmitter-receivers B1 and B2 are identified by the subscript numerals 1 and 2 respectively.)

The two transmitter-receivers are controlled with timing by their respective sync generators SYCGEN for transmission and reception in the alternate relationship with each other.

FIG. 21 illustrates a time chart showing the exchange of voice signals between the two narrow-band voice communication transmitter-receivers B1 and B2 portrayed in FIG. 20. Without regard to the subscript numerals, represented by VM is a transmitting voice signal, SWT is a shift pulse for transmission and reception generated by the control switch SW, and VSP is a received voice signal. Also, T is a transmission period of time, R is a reception period, and T0 is a cycle of transmission and reception. (Hence, the reciprocal of T0 or a repeat frequency is denoted by F0.)

In the operation between the two transmitter-receivers, the transmitting voice signal VM is sampled at intervals of time so that about a half of the same is received as the received voice signal VSP. This results in intermittent transmission of a signal from one station to the other. Fortunately, a voice sound of speech is redundant and the transmission of speaking sounds becomes possible if the repeat frequency F0 is appropriately predetermined. The received voice sounds are yet unfavorable to human ears and somewhat less audible.

For improvement, a method has been introduced in which the blank portions C0 of a signal resulting from time sampling are compensated. However, the result is still unsatisfactory and can hardly be appropriate for practical use.

Also, another type of duplex operating radio transmitter-receiver has been developed in which the transmitter delivers intermittent radio signals on a modulated carrier through time dividing an original voice signal and compressing a talk duration and the receiver, upon receiving and detecting the transmitting radio signals, demodulates them to the original voice signal by time expanding and rebinding the intermittent signals in synchronism with the action of the transmitter. The synchronizing action is controlled by one of the two transmitter-receivers which serves as a "master station" and is arranged to determine the time allocation of time divided segments of a modulated signal during transmission so that the other transmitter-receiver which serves as a "slave station" can be actuated in synchronism.

This transmitter-receiver will now be explained in more detail referring to the drawings.

FIG. 10 shows an arrangement of the transmitter-receiver, as compared to the arrangement shown in FIG. 20. The narrow-band voice communication transmitter-receivers B1 and B2 are identical in block diagram representation to those illustrated in FIG. 20, although the subscript numerals in FIG. 10 are of large size for distinction from those of small size in FIG. 20. FIG. 11 is a time chart, similar to FIG. 21, showing the exchange of voice signals between the two transmitter-receivers B1 and B2. Without regard to the numeral subscripts, represented by VM is a transmitting voice signal, SWT is a shift pulse for transmission and reception generated by a control switch SW, and VSP is a received voice signal. The shift in SWT is carried out in every half of T0 during intermittent transmission of the voice signal.

A voice signal transmitted from the transmitter-receiver B1 to B2 is denoted by the real line while another voice signal from B2 to B1 is denoted by the dotted line. A difference of the exchange of those signals shown in FIG. 11 from in FIG. 21 is that the voice signal is processed by time compression and expansion. More specifically, at the transmission side, a transmitting voice signal VM derived from a microphone MIC, which is represented by the numeral ① (or ⑤)—the numeral in brackets will represent a signal expressed by the phantom lines hereinafter—is time divided at equal intervals and time compressed to ½ as represented by ② (or ⑥) and thus, becomes a series of carrier modulated signals of time compressed voice information which are in turn transmitted as an intermittent radio wave. At the reception side, the time compressed, intermittent voice signals ⑦ (or ③) after received and detected are time expanded and bound together in sequence to a continuous voice signal ⑧ (or ④) which is converted to acoustic energy by a loudspeaker SP for sound reproduction.

As the result of the above process, continuous quality voice sounds unlike the unfavorable intermittent sounds shown in FIG. 21 will be delivered to listener's ears. The radio wave employed has only one frequency f and still enables "duplex operating communications" which is commonly executed with conventional wire telephones.

The processing of voice sounds including "time division", "time compression", and "time expansion" can be implemented by an analog or digital procedure.

Both the analog and digital procedure are illustrated in detail in FIGS. 12, 13, and 14.

FIG. 13 is a block diagram showing a transmitter for execution of the analog procedure (in which the subscript numeral 1 is not shown for simplicity).

A clock frequency 2 fCLK delivered from a reference oscillator OSC is divided by a ½ divider DIV to a clock frequency fCLK which is in turn fed to a switch controller SWCONT. Those components constitute in combination the sync generator SYCGEN shown in FIG. 10.

The switch controller SWCONT is arranged for control of a control switch SW comprising three co-operable switches SWa, SWb, and SWc.

FIG. 12 is a timing chart showing the action of FIG. 13.

The action will now be described referring to FIGS. 12 and 13. A voice signal VM is suppressed by an anti-aliasing noise removing lowpass filter AALPF (which is adapted for not limiting the band of voice frequencies but preventing the mixture of a sampling noise with the voice signal) to a frequency band of not more than 3 kHz so as to avoid interference with the clock frequencies fCLK and 2 fCLK and then, written into a couple of analog shift registers ASRa and ASRb alternately. Subsequently, the band suppressed voice signal is read from the two analog shift registers ASRa and ASRb. Both writing and reading speeds are proportional to clock frequencies supplied to their respective analog shift registers. First, the clock frequency fCLK is fed via the switch SWc to ASRa into which the voice signal is recorded during a storage time Ts. Upon completion of the writing, all the switches are turned over. (FIG. 13 shows a state just after the turning over of the switches.)

The clock frequency for ASRa is then changed to 2 fCLK by the switchover action of the switch SWc. Simultaneously, the voice signal which has been time compressed is transferred at a speed of two times the writing speed (i.e. during an output time Tc which equals ½ of the storage time Ts) via the switch SWa to a band-limit filter BLLPF. This action is denoted in the first row of the chart of FIG. 12.

During the output time Tc, the voice signal is written into the analog shift register ASRb throughout the storage time Ts using the clock frequency fCLK supplied through the switch SWb. After completion of the writing, the switch SWb is turned over and the clock frequency is shifted to 2 fCLK. Accordingly, the time compressed voice signal is fed via the switch SWa to the band-limit filter BLLPF at a speed of two times the writing speed (i.e. during the output time Tc which equals ½ of the storage time Ts). This action is denoted in the second row of the chart of FIG. 12.

At the moment when the signal output from ASRa has been completed as shown in the first row, the writing into ASRb shown in the second row is halfway through. Thus, the output of the band-limit filter BLLPF is followed by a blank period which equals Ts-Tc or ½ of Ts.

As the actions shown in the first and second rows are repeated alternately, a series of intermittent voice signals shown in the third row of the chart of FIG. 12 are output from the band-limit filter BLLPF. Those intermittent voice signals are equal to the intermittent signals represented by ② (or ⑥) of FIG. 11. The description of "time division" and "time compression" in the analog procedure of a voice signal at the transmission side is now finished.

The "time expansion" and demodulation in the analog procedure of a voice signal at the reception side is executed by the arrangement similar to that of FIG. 13, in which like components are denoted by like abbreviations accompanied with the subscript numeral 2 while both AALPF and BLLPF are not used. In operation, VM is an intermittent, compressed voice signal acquired through reception and detection while the clock frequencies fCLK and 2 fCLK are supplied in reverse by the action of the control switch SW.

Accordingly, a resultant continuous, time compressed voice signal given through demodulation is reproduced, at the absence of the band-limit filter BLLPF, in the form denoted by ⑧ (or ④) of FIG. 11.

FIG. 16 is a block diagram showing in more detail the arrangement of the transmitter-receiver B1 shown in FIG. 18 (which is equal to that of B2 at the other station).

A reference oscillator OSC1 is adapted to trigger a flip-flop FF1 using a frequency of a few hertz. The flip-flop FF1 activates a transmitter TX1 and a receiver RX1 alternately for on/off operation. The terminal Q1 of the flip-flop FF1 delivers command signals for actuating the transmitter TX1 and performing the ½ time compression of the voice signal and the terminal Q̄1 for actuating the receiver RX1 and the x2 time expansion of the voice signal.

In operation, the voice signal from a microphone MIC1 is time divided and compressed by an audio processor VSD1 to an intermittent signal such as denoted by ② of FIG. 11 (also, shown in the third row of FIG. 12). The intermittent signal is then modulated by the transmitter TX1 and transferred via an antenna coupler AT1 to an antenna ANT1 from which it is emitted in the form of a radio wave.

The receiver RX1 is then triggered by a command signal from the terminal Q̄1 for receiving the intermittent radio wave transmitted from the transceiver B2 of the slave station.

The intermittent radio wave after received is delivered to a front end high-frequency amplifier RXFE1 (which contains a mixer and is coupled to the input of an intermediate-frequency amplifier IFA1) and fed across the intermediate-frequency amplifier IFA1 to a detector DET1 where it is detected and further, transferred to a signal processor VSH1. The signal processor VSH1 repeats two alternate actions which are opposite to the actions expressed in the first and second rows of FIG. 12, in which each unit segment of the intermittent signal is fed during the high level at Q1 and time expanded until the next high level is induced. A resultant continuous voice signal is then fed via an audio power amplifier PA1 to a loudspeaker SP1 for sound reproduction. As also shown in FIG. 16, the aforementioned repeating operation of the two alternate actions is accurately controlled by both a square-wave signal TSG1 which is supplied from the terminal Q1 along a line TL1 to a front end TXFE1 disposed in front of a modulator MOD1 in the transmitter TX1 and a square-wave signal RSG1 which is supplied from the terminal Q̄1 along a line RL1 to the receiver RX1.

It should be understood that both the square-wave signals TSG1 and RSG1 of the transmitter-receiver B1 have to be correctly synchronized with those, TSG2 and RSG2, of B2 for synchronous communication between B1 and B2.

FIG. 17 is a block diagram showing a transmitter-receiver which acts as a slave station receiver and is arranged to actuate in synchronism with the action of the master station transmitter of FIG. 16. FIG. 18 shows a block diagram of the primary parts of their respective transmitter-receivers shown in FIGS. 16 and 17 for ease of description of the synchronizing action. FIG. 19 is a timing chart illustrating the synchronizing action between the two stations.

In the synchronizing action, the master station needs no particular procedure while the slave station is controlled corresponding to the action of the master station. More specifically, the slave station is actuated for the synchronization in which a carrier signal is picked up from the input of a detector DET2 by a carrier detector CAD2 and then, the decay CU2 of a resultant carrier detection signal ⑤ shown in FIG. 19 is detected by a decay detector CAP2 to develop TP2 of a pulse signal ⑥ which is in turn fed as a trigger signal to a monostable multivibrator MB2 provided in place of the flip-flop FF1 of FIG. 16. The multivibrator MB2 then delivers from its terminals Q2 and Q̄2 two square-wave signals TSG2 and RSG2 respectively for control of voice signal processing and thus, the synchronizing action will be ensured.

In more detail, the slave station B2 when energized or serving as the receiver remains in a reception standby state with the monostable multivibrator MB2 closed at Q2 and upon reception of a transmitting signal from the master station B2, allows a detection signal ⑤ to be generated from a received carrier signal ④ of the intermediate-frequency amplifier IFA2, as shown in FIG. 19. The decay of the detection signal ⑤ is then detected by the detector CAP2 (a differentiating circuit) for generating a trigger pulse TP2. The trigger pulse TP2, which is a signal of completion of the signal transmission and start of the signal reception at the master station, causes the monostable multivibrator MB2 to switch over the operation and deliver the square-wave signal TSG2 ⑧ for transmission while the square-wave signal RSG2 ⑦ for reception is halted. The duration of the switch action of the monostable multivibrator MB2 is determined by the timing of the master station B1 so that B2 can automatically be turned back to the reception state when B1 shifts from the reception state to the transmission state.

The synchronizing action described above is an example and various other synchronizing methods will equally be employed.

Also, the monostable multivibrator MB2 in the slave station may be replaced with a flip-flop circuit which will be activated by a trigger pulse associated with both the rise and decay in the detection signal ⑤ derived from a received carrier signal ④ of the intermediate-frequency amplifier IFA2. In this case, the rate of time compression other than the repeat time T0 can be detected in the slave station and used for determining a ratio between transmission and reception periods of the slave station, whereby the synchronizing procedure will be facilitated.

Furthermore, the synchronizing action may be executed by an independent synchronization method in which reference signals emitted from two reference oscillators provided in their respective communicating transmitter-receivers B1 and B2 are utilized for generating timing signals for transmission and reception which are then processed in correlation relationship for synchronization between B1 and B2. This method however claims a considerable length of time before the synchronizing action is completed and also, will be more disadvantageous in the respect of cost than the previous method. The advantages of this method are that the two stations are less discriminated from each other thus increasing the freedom of communications and that error in the synchronizing action is minimized whereby communication stability will be enhanced.

It would be understood that the transmitter-receiver also acts as a common press-talk type transceiver when an additional component for temporarily canceling the action of both the audio processor and the synchronizing device is installed.

FIG. 14 is a block diagram for use in the digital processing of voice signals.

In operation at the transmission side, a transmitting voice signal VM is filtered by AALPF for band suppression, converted into a digital form by an A/D converter ADC, and transferred at a common speed (e.g. 8 kHz) to a random access memory RAM for storage at a given address. After a predetermined period of this action, the signal is read out at a speed of two times the common speed (hence, 16 kHz) and converted back to an analog form by a D/A converter DAC in the same manner as expressed in the first row of the chart of FIG. 12.

Just after the completion of storage of the preceding signal, a succeeding signal is stored into another address of the RAM and retrieved subsequently, which is illustrated in the second row of FIG. 12.

Then, the repeating of both the first and second row procedures results in generation of an intermittent signal, as shown in the third row of FIG. 12, which is in turn output through a band-limit filter BLLPF.

Also, the foregoing procedures are controlled by an audio signal pitch controller CTR containing a microcomputer. In other words, this CTR serves as a combination of SYCGEN and SW of FIG. 10 (cf. like controllers shown in FIGS. 16 to 18 will operate the same as described later). More particularly, CTR delivers start signals to the converters ADC and DAC respectively and controls the memory RAM for determining a storage location and performing the writing and reading at different speeds.

In operation at the reception side, the intermittent, compressed voice signal acquired through reception and detection is processed for demodulation by the arrangement shown in the block diagram of FIG. 14 at reverse writing and reading speeds and in a reverse manner and then, delivered as a common continuous voice signal.

Those conventional duplex voice communication transmitter-receivers however have some disadvantages.

Such disadvantages are particularly emphasized in the articulation and intelligibility of voice sounds. Among them is that when the frequency range (occupied band width) of an assigned radio wave for use in communication is legally defined by two limited values, the compression of a voice signal may result in increase of the range and surpass of the limited value thus causing radio interference.

Another disadvantage resides in synchronous error.

When a synchronous error is caused during expansion and rebinding of divided components of a received signal in the reception side and a resultant reproduced signal contains gaps, unwanted noises such as burst sounds will appear rendering the reproduced voice message inaudible. Accordingly, the synchronizing action should always be executed by such a definite and tough manner as never being affected by fading.

Also, a further disadvantage is that a specific measure is needed for allowing the master station (which transmits voice information) to select a target slave station (which receives the information) from a number of local stations because the communication is carried out using one signal frequency between two different stations which are designated as a master station and a slave station. If the selection of one single slave station fails, the communication of the master station will be involved with plural slave stations concurrently thus causing confusion.

A still further disadvantage resides in time delay which will be induced during the voice processing including "time division", "time compression", and "time expansion" and "signal rebinding". The time delay will slow down the velocity of communications as if they are exchanged through a satellite circuit.

It is thus an object of the present invention to provide a duplex voice communication radio transmitter-receiver which is capable of operating even when the frequency range of a legally assigned radio wave used for communication is strictly limited, much improved in the use of a frequency, less affected by fading, enhanced in the ability of secret communication, and arranged to provide no slowdown during the communication and higher articulation and intelligibility in reproduced sound.

SUMMARY OF THE INVENTION

The duplex voice communication radio transmitter-receiver of the present invention contains a lowpass filter provided prior to a time compressing device in a transmitter section for cutting off a high frequency portion of the band of a transmitting voice signal and reducing the maximum modulation frequency to less than a half.

More preferably for enhancing the articulation and intelligibility of reproduced voice sounds, its receiver section has a device for processing of a received voice signal acquired through reception and detection in which a quasi high-frequency component signal, which corresponds with the high-frequency portion of the transmitting voice signal which has been cut off by the transmitter section of a master station for limiting the maximum modulation frequency, is generated and added to the received signal.

The device for generating the quasi high-frequency component signal comprises, in combination:

- a device for generating a distortion signal from the received voice signal acquired through reception and detection by cutting the amplitude of the same with the use of a given threshold, a device for band suppressing the distortion signal, and a device for varying the amplitude of a signal generated through band suppression of the distortion signal in relation to the amplitude of the received voice signal acquired through reception and detection; or
- a device for generating a distortion signal by passing the received voice signal acquired through reception and detection across a predetermined nonlinear circuit and a device for band suppressing the distortion signal.

Furthermore for enhancing the articulation and intelligibility of reproduced voice sounds, a means for synchronizing between the master and slave stations is also provided comprising:

- a couple of devices installed in the transmitter section of the master station and the receiver section of the slave station respectively for generating their respective time dividing patterns which are identical in the shape and reverse in the duration of transmission and reception to each other; and
- a system for providing a timing point pulse or determining "a timing for use in matching the two time dividing patterns in phase to each other".

The latter system comprises, in combination: a device for assigning the timing point pulse to each composite tone signal which consists of a plurality of continuous tone signals and adding the composite tone signal to each divided, compressed voice signal; a device for modulating a carrier wave with a resultant composite sync signal produced through the addition of the two signals, both the devices being arranged in the transmitter section of the master station; and a device arranged in the receiver section of the slave station for extracting the tone signals and the timing point pulses from the composite sync signal reproduced through reception and detection.

Also, at least the first tone signal among the plural tone signals is designated as an auxiliary signal and the timing point pulse is carried at a given phase position in a predetermined one, equal to or more than the second, of the tone signals so that the identification of the timing point can be assured.

Furthermore, a device for selecting and calling for a desired slave station with the use of a combination of the tone signals may be added.

For eliminating the slowness caused by time delay in a voice signal and increasing the intelligibility, the time compressing device comprises an A/D converter for conversion of a voice signal, a device for writing a digital signal produced through the conversion into a memory, a device for upon completion of the writing of a half or more of a preceding unit segment of the digital signal, reading a proceeding segment of the digital signal from the memory while compressing it at the same time, and a D/A converter for converting the digital segment retrieved into a divided compressed voice signal.

Simultaneously, the time expanding device comprises an A/D converter for conversion of the divided compressed voice signal, a device for writing a digital signal produced through the conversion with the A/D converter into a memory, a device for upon start of the writing of a proceeding unit segment of the digital signal, reading a preceding segment of the digital signal from the memory while expanding it at the same time, and a D/A converter for converting the digital segment retrieved into an original divided voice signal.

An optimum result will be given when the time compression and time expansion are $1/n$ and $n$ respectively (where $n$ is a positive real number of not less than 2).

BRIEF DESCRIPTION OF THE DRAWINGS

FIG. 1 is a timing chart showing the action of a duplex voice communication radio transmitter-receiver according to the present invention;

FIG. 2 is a view showing the primary parts of both master and slave stations for explanation of duplex operating radio communication;

FIG. 4 is a block diagram showing an audio signal processor at the transmission side;

FIG. 5 is a block diagram showing an audio signal processor at the reception side;

FIG. 6 is a block diagram showing an arrangement for adding a quasi high-frequency component signal to the demodulated voice signal;

FIG. 7 is a block diagram showing another arrangement for adding a quasi high-frequency component signal to the demodulated voice signal;

FIG. 8 is a waveform diagram showing conventional tone signals;

FIG. 9 is a waveform diagram showing tone signals in an embodiment of the present invention;

FIGS. 23-a to 23-d are explanatory views showing the content of a fading noise.

Figure 3:
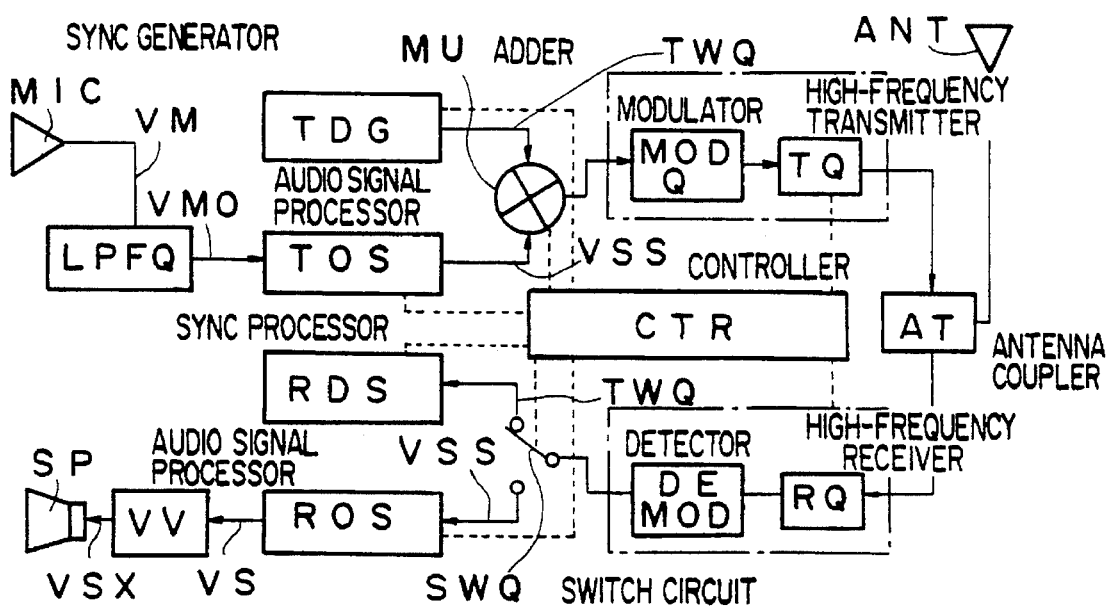
FIG. 3 is a block diagram showing the arrangement of both the master and slave stations.
Figure 10:
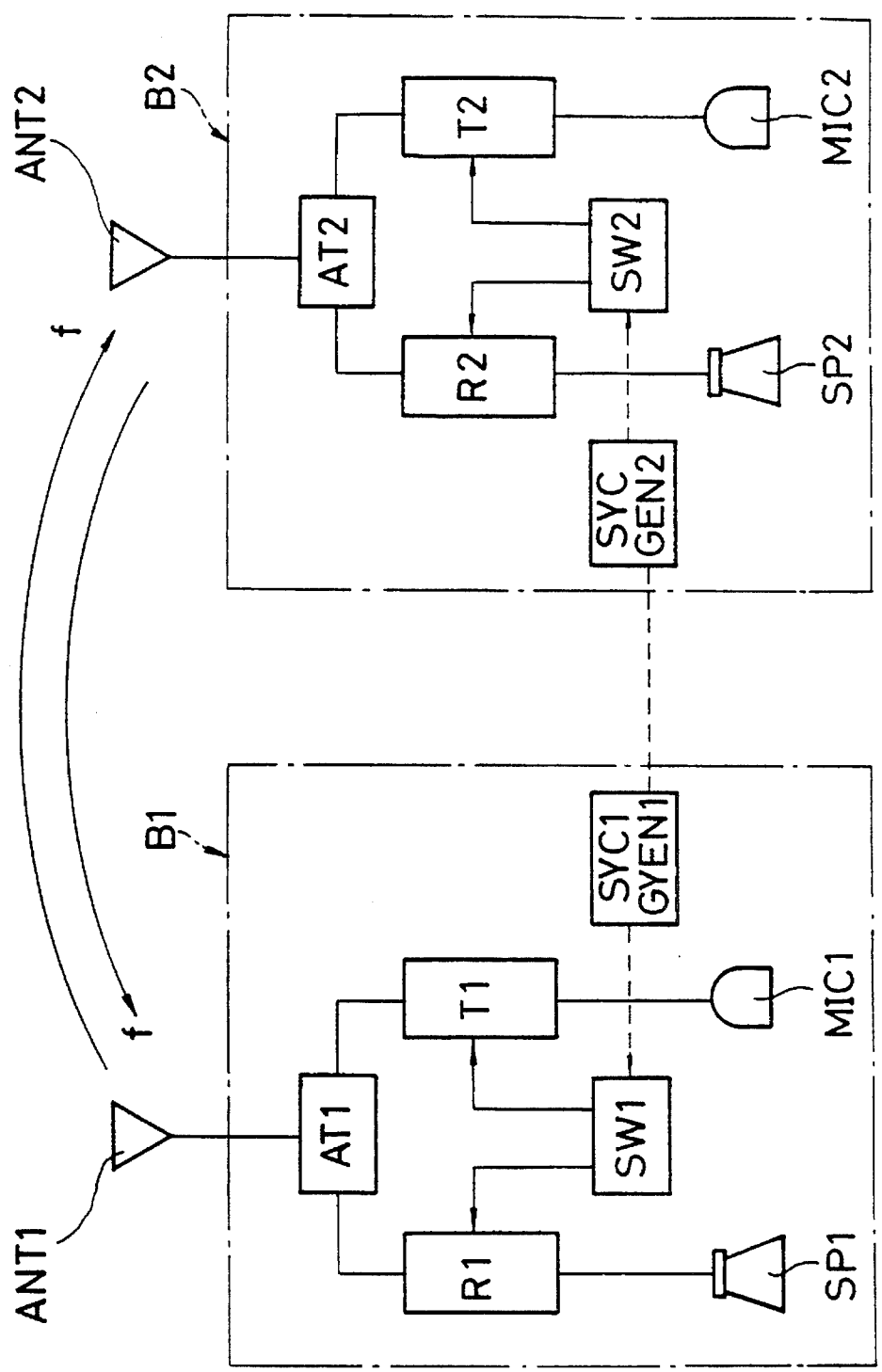
FIG. 10 is a block diagram showing the arrangement of known radio transmitter-receivers and the exchange of radio signals between the same.

Here is a list of the abbreviations used in the drawings.

LPFQ: band-rejection filter, VMQ: voice signal of which maximum frequency is limited, F0: switch frequency, VS: demodulated voice signal, VARAMP: variable gain amplifier, VHQ: quasi high-frequency component signal, SUM: adder, VSX: natural voice signal close to original, NLIN: nonlinear circuit, CTR: controller with a built-in microprocessor, TWQ: sync tone signal, TDG: sync generator, VMQ: voice signal of which higher band is suppressed, VSS: intermittent, compressed voice signal, TOS: audio signal processor, MODQ: modulator, MU: adder, DEMOD: detector, TWQ: sync tone signal, RDS: sync processor, ROS: audio signal processor, SWQ: switch circuit, TDG: sync generator, TQ and RQ: high-frequency transmitter and receiver, TSQ: transmission period, RSQ: reception period, RDS: sync generator, CUQ2: timing point pulse, DT1 and DT2: tone signals, B: transmitter-receiver (Two stations are distinguished from each other by the subscript numerals 1 and 2), VM: transmitting voice signal, VSP: received voice signal, SWa, SWb, and SWc: co-operative switches, SWCONT: switch controller, AALPF: anti-aliasing noise removing lowpass filter, ASRa and ASRb: analog shift registers, BLLPF: band-limit filter, ADC: A/D converter, RAM: random access memory, DAC: D/A converter, OSC: reference oscillator, FF: flip-flop, TX: transmitter, RX: receiver, MIC: microphone, VSD: audio signal processor, AT: antenna coupler, ANT: antenna, RXFE: front end, IFA: intermediate-frequency amplifier, DET: detector, VSH: signal processor, PA: transmission power unit, SP: loudspeaker, DET: detector, CAD: carrier detector, CAP: decay detector, MB: monostable multivibrator, and TSG and RSG: switch signals for transmission and reception.

DETAILED DESCRIPTION OF THE PREFERRED EMBODIMENTS

For more detailed description of the present invention, preferred embodiments of the present invention will now be explained referring to the accompanying drawings.

Embodiment 1

As described previously, the processing of a voice signal including "time division", "time compression", and "time expansion" has a drawback in either analog or digital mode.

More specifically, the drawback is that the maximum modulation frequency (designated as 3 kHz for ease of explanation) is doubled by time compression of a voice signal to ½ thus increasing the frequency band width of the signal. As the result, a radio wave emitted may surpass the legally assigned limitation and become of no use. This phenomenon will be emphasized when the rate of compression (or expansion) is not less than 2.

For elimination of the drawback, the present invention employs a lowpass filter LPFQ (referred to as a band-limit filter hereinafter) arranged to reduce the modulation frequency to ½ and limit the maximum modulation frequency (e.g. to 1.5 kHz).

Figure 14:
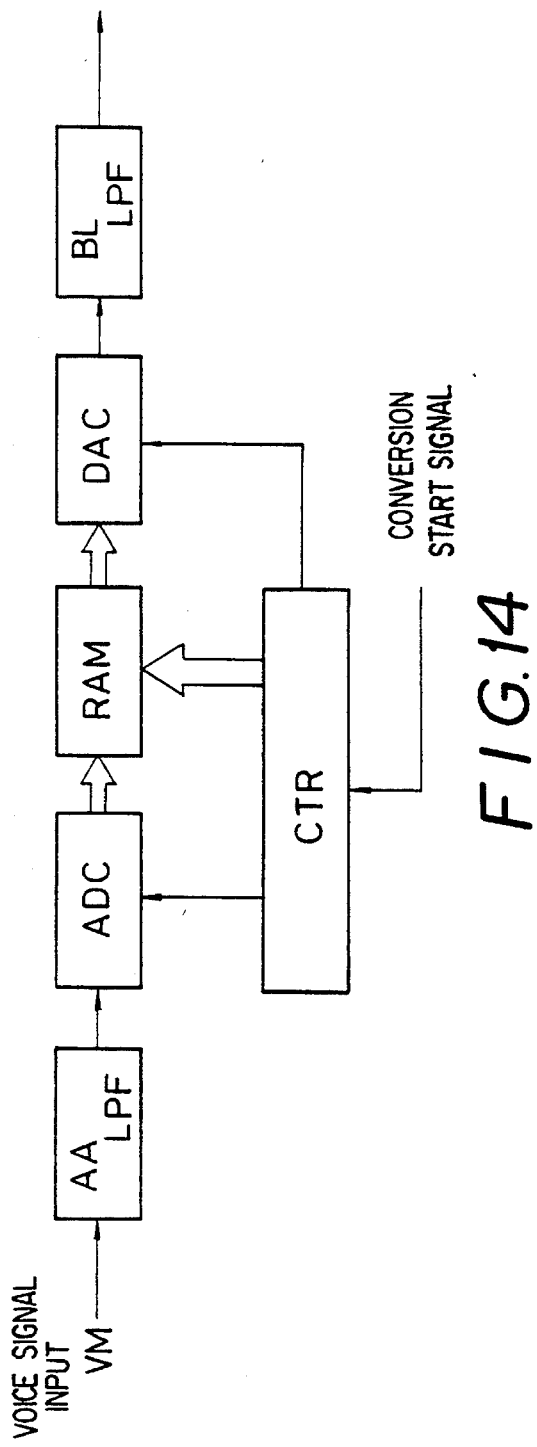
FIG. 14 is a block diagram showing a digital procedure of the same operation.

FIG. 4 illustrates such an arrangement according to the present invention, in which the band-limit filter LPFQ is provided before AALPF, which is described in FIG. 14, for processing a voice signal fed from a microphone MIC to produce a signal VMQ by decreasing the maximum modulation frequency.

It is known that a voice sound remains almost intact for communications when its modulation frequencies are reduced to below ½ by filtering.

Figure 15B:
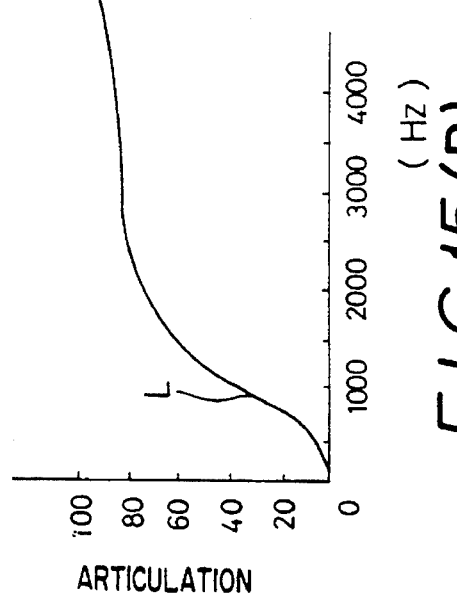
FIGS. 15(A) and 15(B) is a diagram showing the distribution of energy in a voice signal.
Figure 15A:
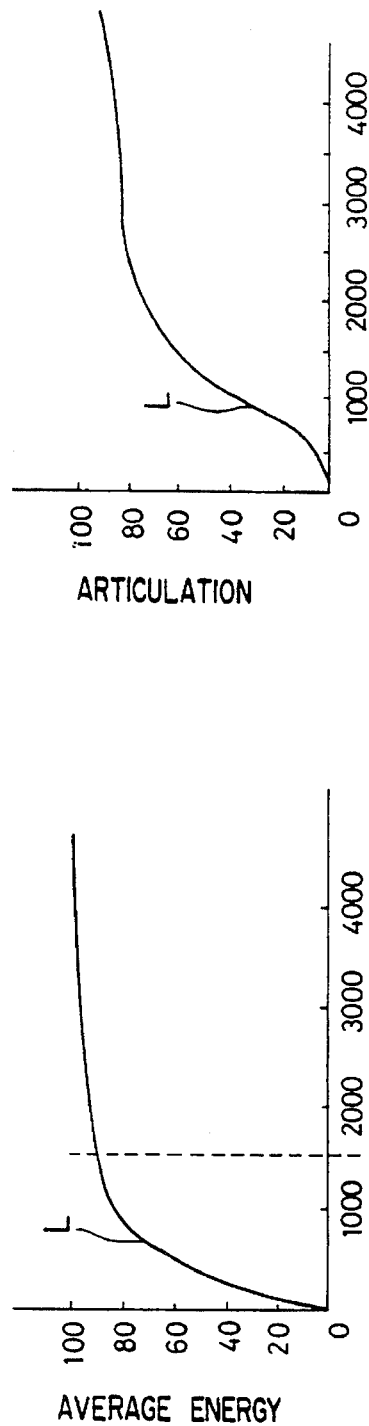
Figure 16:
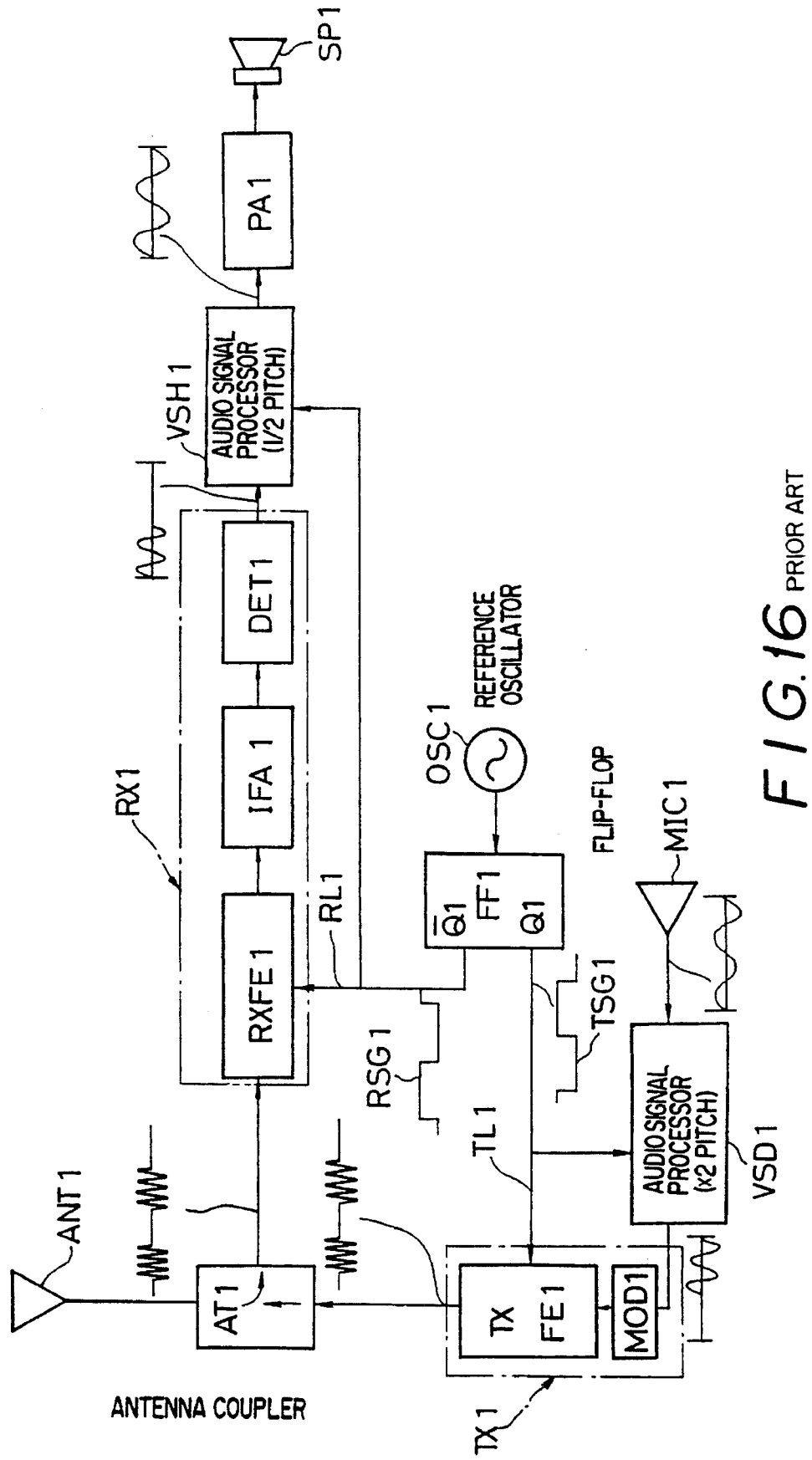
FIG. 16 is a block diagram of a prior art radio transmitter-receiver serving as the master station.

This will be described in more detail. FIG. 15-A is a graphic diagram showing the distribution of voice energy in relation to frequencies, in which the voice energy exhibits more characteristic distribution in a lower frequency range. Even if the frequency band of a voice signal used in this embodiment is suppressed to below 1.5 kHz by the band-limit filter LPFQ (which has a characteristic curve L), about 90% of the voice energy remains in the frequency band.

FIG. 15-B shows the relation between articulation and frequency expressed by a characteristic curve L of the band-limit filter LPFQ. The articulation is about 60 to 70 at the frequency of 1.5 kHz.

It is thus assumed that the intelligibility of voice sounds is rarely declined after blocking frequencies of more than 1.5 kHz with the band-limit filter LPFQ.

This effect has successfully been verified by the inventor(s) of the present invention through experiments.

Embodiment 2

When the frequency band of a voice signal VMQ to be modulated has been reduced to below 1.5 kHz by cutting off a higher range of frequencies with the band-limit filter LPFQ (having a characteristic curve L) as shown in FIG. 4, the intelligibility at the receiver section can remain at high level. But, a reproduced voice sound with the absence of high tone is not natural.

For reproduction of more natural voice sounds, the present invention provides a further procedure of processing the received voice signal.

In the procedure, a quasi high-frequency component signal equivalent to the higher frequency band which has been cut off in the transmitter section of a master station is generated by the receiver section of a slave station and added to the received voice signal acquired through reception and demodulation before emitting from a loudspeaker SP.

The quasi high-frequency component signal may be generated by various known methods. One of the methods is for example shown in FIG. 6.

A voice signal VS acquired through signal reception and demodulation is amplitude modulated by an amplitude limiter LIM, suppressed by a band filter BPF to a frequency band of 1.5 to 3 kHz, attenuated by blocking a higher frequency range with a lowpass filter LPF, and transferred to a variable gain amplifier VARAMP.

The amplifying rate of the variable gain amplifier VARAMP can be varied by means of a signal which is created through detecting the amplitude of the voice signal VS with an amplitude detector DET.

Accordingly, the variable gain amplifier VARAMP delivers an output in the form of the quasi high-frequency component signal VHQ to be utilized which is in turn combined by an adder SUM with the voice signal VS to produce a more natural voice signal VSX which is close in quality to the original voice.

FIG. 7 illustrates another procedure of generating the quasi high-frequency component signal.

A voice signal VS acquired through signal reception and modulation is supplied via an amplifier AMP to a nonlinear circuit NLIN where it is shifted to higher harmonics. The harmonics are then filtered by a bandpass filter BPF and attenuated by an attenuator ATT to a quasi high-frequency component signal VHQ which is in turn combined by an adder SUM with the voice signal VS to produce a more natural voice signal VSX to be desired. The nonlinear circuit NLIN may be a square-law circuit or a known appropriate circuit.

Embodiment 3

The switch frequency F0 for switching between transmission and reception is predetermined within a range from 1 to 10 Hz whichever is appropriate for use.

It is found that F0 ranging 1 to 10 Hz in such a duplex voice communication radio transmitter-receiver is one of the substantial requirements for reproduction of voice message with appreciable intelligibility and secrecy. If F0 is out of this range, the secrecy depending on human perceptivity will be declined in spite of the use of elaborate means, described later, although the intelligibility remains almost unchanged.

In general, speech comprises several syllables per second and when its signal is time compressed to ½ using a frequency of 1 to 10 Hz, a resultant blank period becomes equal to the length of a syllable. Hence, the absence of the syllable will sensitively be perceived in reproduction thus preventing interception of the speech.

Also, the pitch (frequency) of a voice signal is doubled by the ½ time compression whereby reproduced message will be heard with more difficulty.

Accordingly, during radio communication between the transmitter-receivers having the switch frequency F0 of 1 to 10 Hz using half-cycle time compressed radio waves, interception of the content of speech by a third person will almost be impossible even if the radio waves are detected.

Figures 22A, 22B, 22C, 22D:
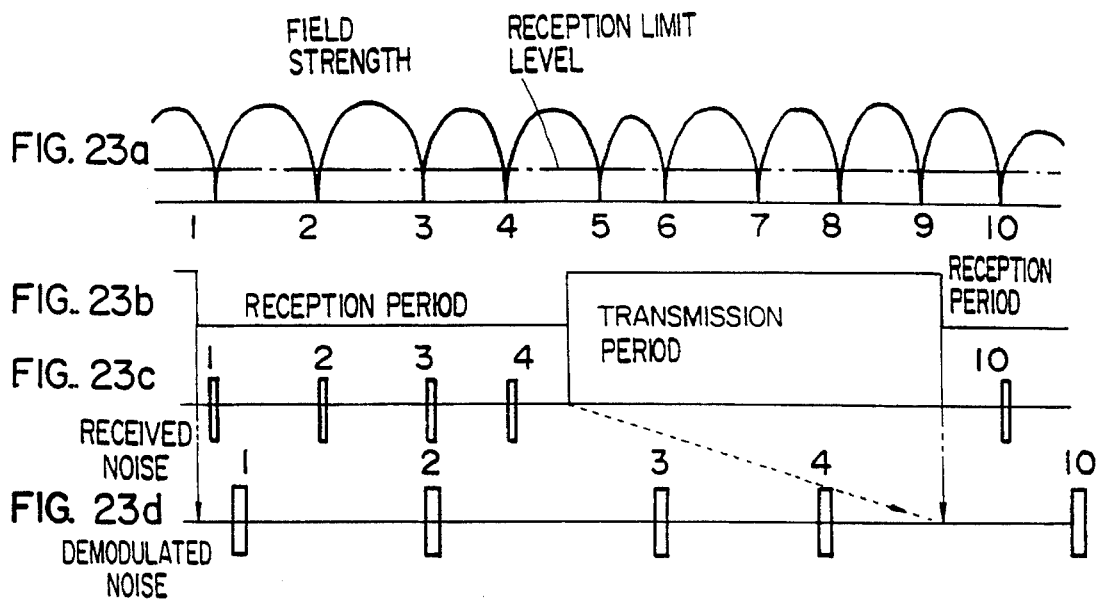
FIGS. 22-a to 22-d are explanatory views showing a visual representation of the secrecy.

For help of more understanding, FIGS. 22-a to 22-d portray a visual representation of the secrecy in which denoted by the small letter a is a series of syllables and b is the same but time compressed with a far lower frequency than 1 Hz (a longer period of time than 1 second).

As apparent from FIGS. 22-a and 22-b, the syllables are more or less aligned and thus, will be acknowledged to a considerable degree. The secrecy can hardly be ensured.

The letter c represents the same but time compressed with a frequency of 1 to 10 Hz, in which the syllables are more separated from each other exhibiting a comb-like form. As the result, reproduced sounds are rarely perceived and the secrecy of speech will be ensured.

Also, the letter d represents the same but time compressed with a higher frequency than 10 Hz in which the syllables are separated into far more segments which in turn become closer to each other in the respect of time. Thereby, the content of speech will be perceived with higher possibility.

Although the results of FIGS. 22-a to 22-d are illustrated in visual form, they have auditorily been verified through experiments.

Embodiment 4

Fading is a known but inevitable drawback in the mobile communications.

The transmitter-receiver of the present invention also contributes to the attenuation of fading.

It is known that transmitting waves in the mobile communications are reflected on building structures or the like and thus, radio communication has to be executed along with the existence of a standing wave derived from mutual interference between a direct radio wave directed to the receiver and a reflected wave. The interference appears approximately every ½ wavelength of the radio wave and the field intensity of a combined wave is largely varied time to time. When a variation in the field intensity exceeds the processing capability of the receiver, a noise is developed causing fading.

The frequency Ff (Hz) of generation of fading noises in the receiver of a mobile station which travels at a speed v (m/sec) is determined by the number of half-wavelengths ($\lambda/2$ where $\lambda$ is a full wavelength in meter) during one second travel of the station and thus, expressed as $Ff=v/(\lambda/2)$. For example, if the frequency f of a transmission wave is 800 MHz and the traveling speed is 20 km/h, the frequency Ff is about 30 Hz. Ff for fading noise generation increases in proportion to both the wave frequency and the traveling speed. Thereby, the higher the frequency Ff, the more the interruption during communication and the lower the communication quality.

FIGS. 23-a to 23-d are explanatory views showing the structure of fading noise, in which the horizontal axis represents time, denoted by the letter a is a change in the field intensity while a limit level of reception is expressed by the one-dot chain line, b is a switch action between transmission and reception, c is a fading noise developed in a received detection signal, and d is a noise developed in a demodulated signal produced through expansion and binding the detection signals. In the demodulated signal, the distance between noises is increased and the frequency of noise generation is reduced. As the result, improvement is automatically made and the extension of the service area of radio communication will be possible.

As apparent from FIG. 23, a particular value should be assigned to the transmission/reception switch frequency F0 relative to Ff. In fact, when F0 is smaller than Ff at v=20 km/h, the attenuation of noise will be optimum.

This is expressed by $F0<30 \cdot f/800$ where f is a frequency in MHz, since Ff is proportional to the frequency of a radio wave to be used.

Embodiment 5

Figure 17:
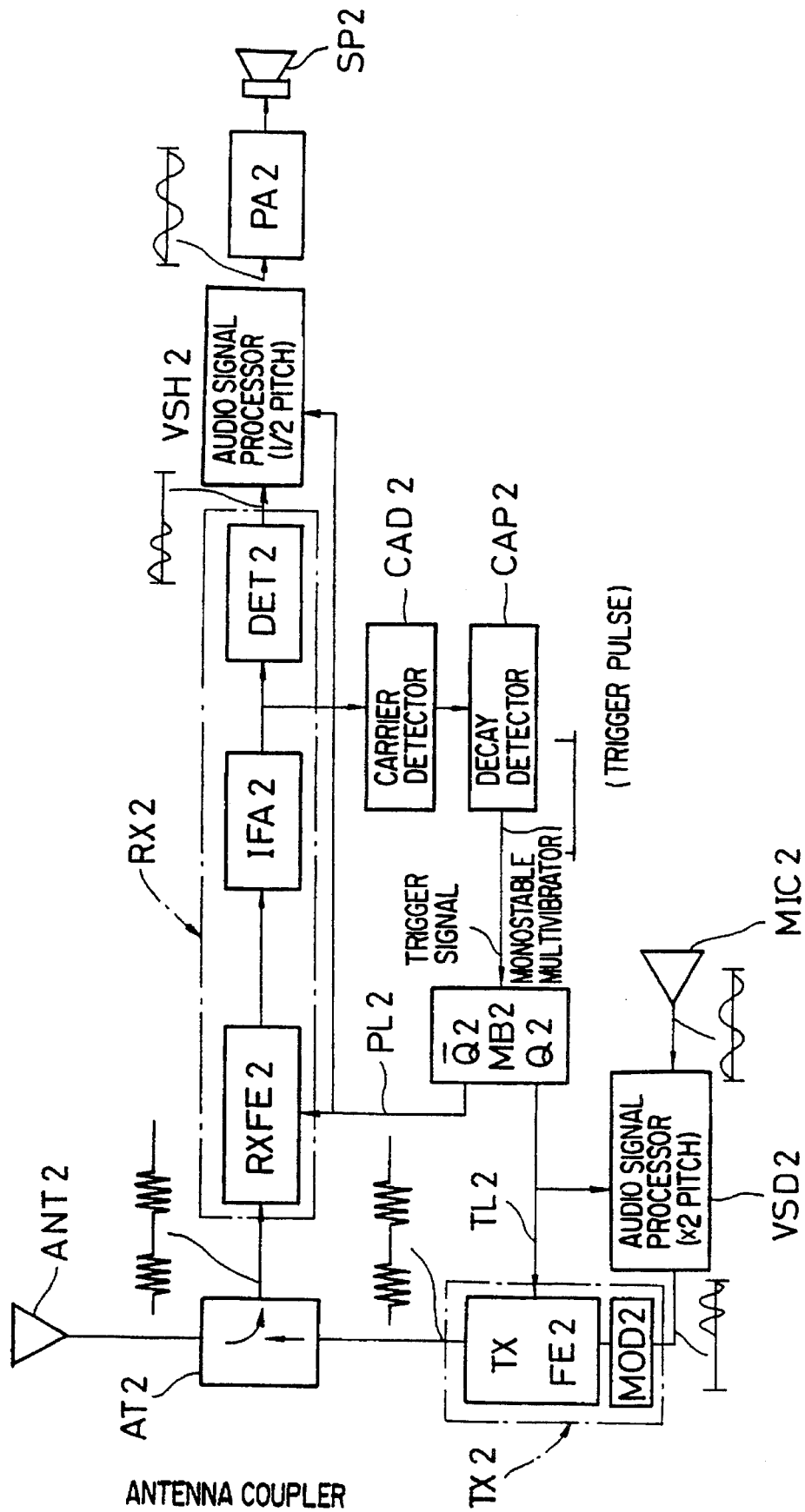
FIG. 17 is a block diagram of the same serving as the slave station.
Figure 18:
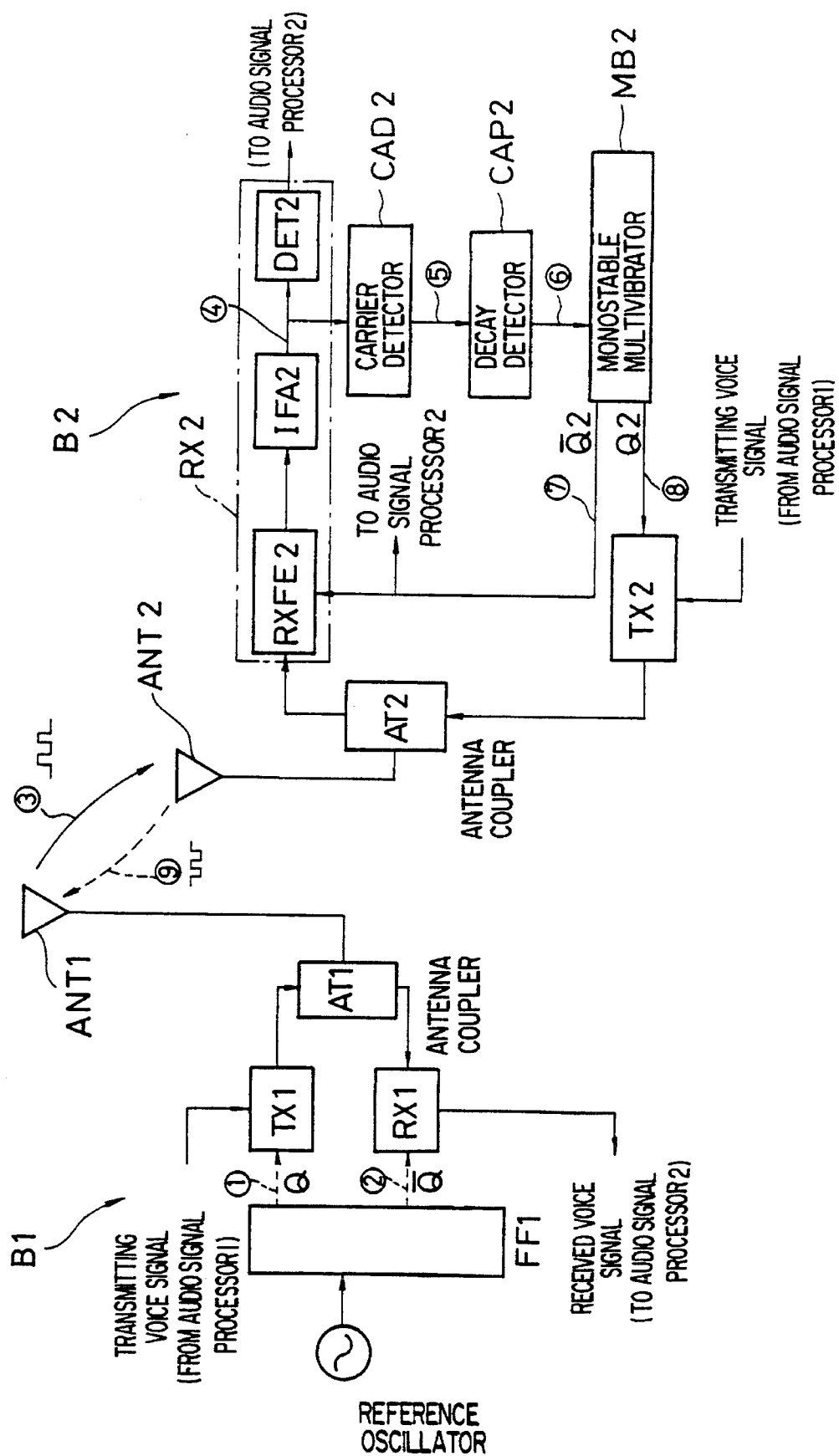
FIG. 18 is a schematic block diagram showing the primary parts of the master and slave stations in synchronizing action.
Figure 19:
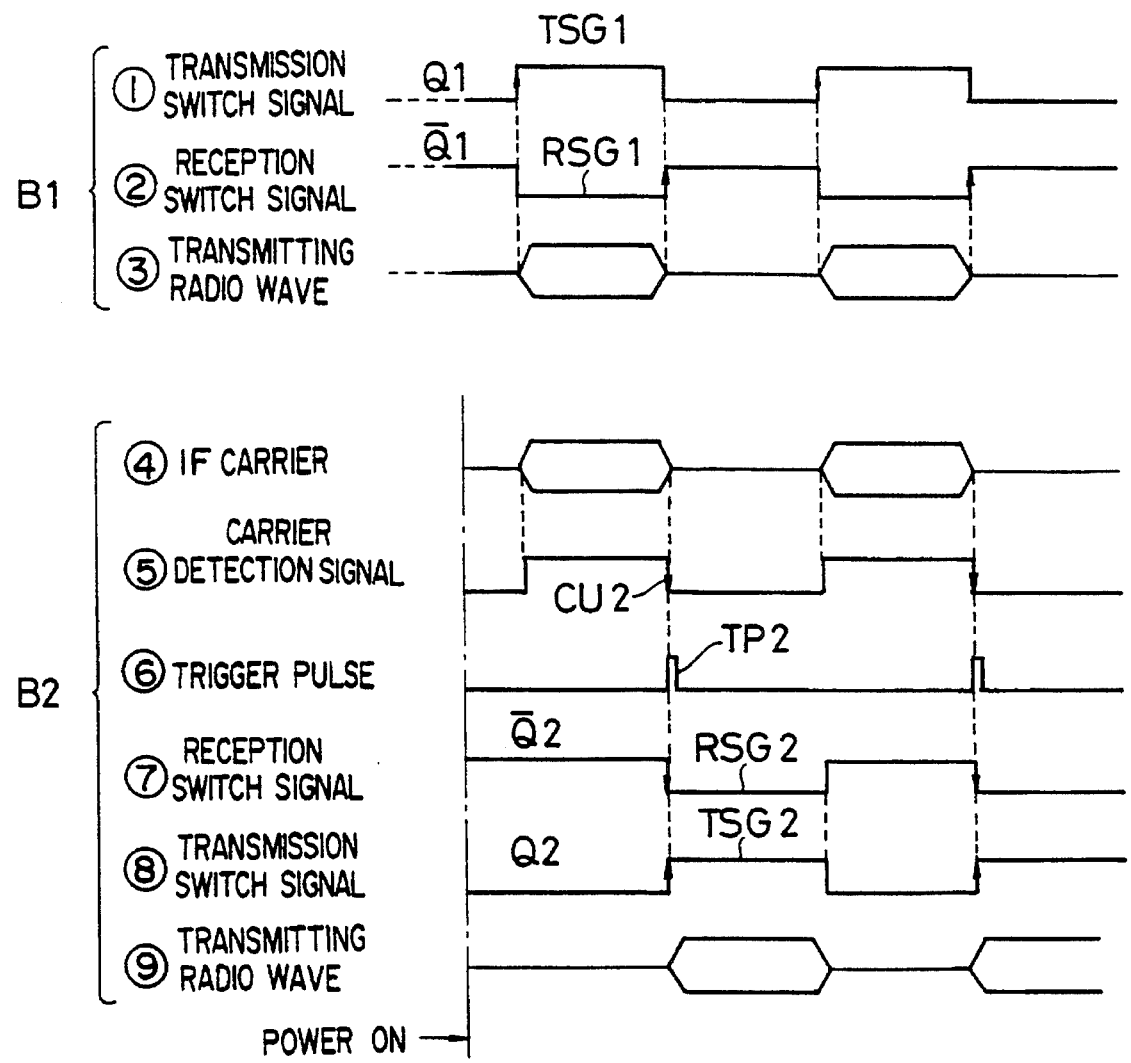
FIG. 19 is a timing chart showing the synchronizing action.
Figure 20:
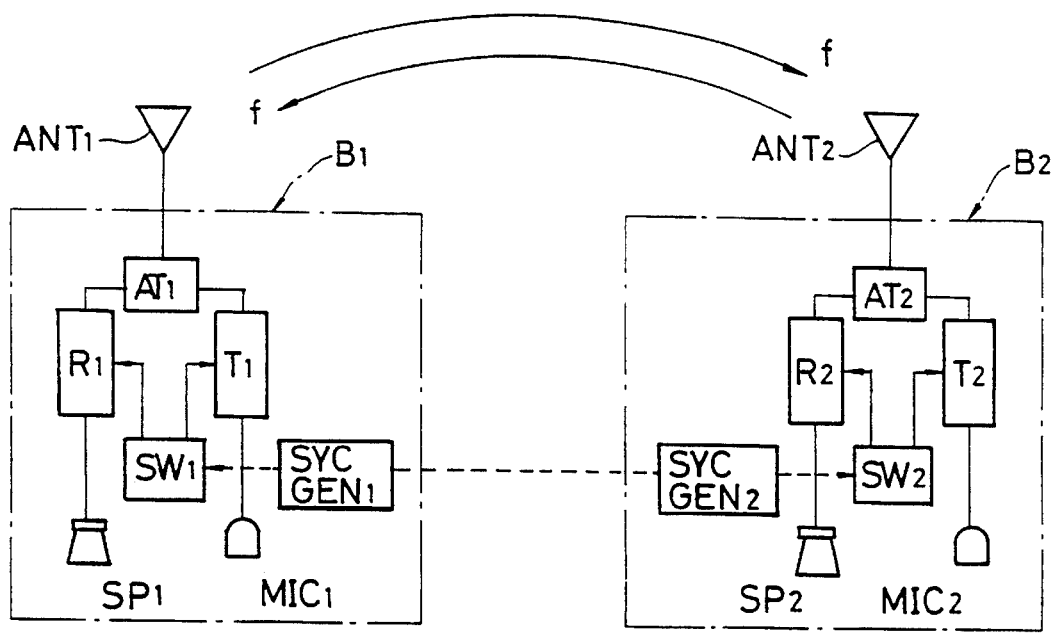
FIG. 20 is a block diagram showing the arrangement of two prior art radio transmitter-receivers.
Figure 21:
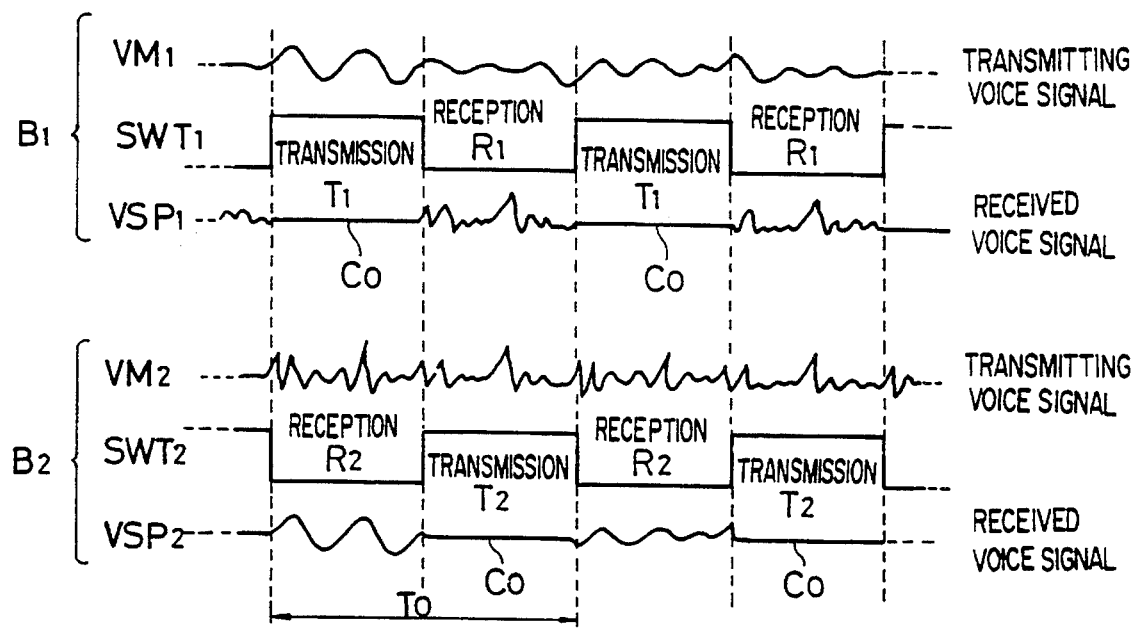
FIG. 21 is a time chart of signals generated during the radio communication.

In the conventional method of synchronization, as shown in FIG. 17, a carrier signal which is picked up from the input signal of the detector DET2 in a slave station is processed by the carrier detector CAD2 and the decay detector CAP2 so that TP2 in a pulse signal ⑥ is developed from the decay CU2 of a carrier detection signal ⑤ shown in FIG. 19. TP2 is transferred as a trigger signal to the monostable multivibrator or flip-flop which is in turn actuated to deliver square-wave signals TSG2 and RSG2 for control of voice processing. During the operation, the carrier signal is possibly attenuated or eliminated due to lower field effect, higher noise, and greater fading and thus, synchronizing error will occur with more frequency.

To prevent the error, the transmitter-receiver of the present invention employs a novel arrangement: primary parts of which, in the combination of master and slave stations, being best portrayed in FIG. 2 for ease of description. Also, the procedure of duplex operating radio communication shown in the timing chart of FIG. 1 is used for operation.

Both the master and slave stations of the present invention are identical in the arrangement which is illustrated in a block diagram of FIG. 3 similar to a composite representation of the diagram of FIG. 2. In FIG. 3, a controller CTR containing a microprocessor and an antenna coupler AT are added for sequential implementation of a signal processing, which will be described beneath in more detail, to the arrangement of FIG. 2. Similarly, the subscripts 1 and 2 clarifying a difference between the master and slave stations are not illustrated for the purpose of simplicity.

The sequence of a simultaneous transmission and reception action will be explained referring to FIGS. 1 and 2.

The transmitter of a master station contains, in addition, a sync generator TDG1 for generating a sync tone signal TWQ, an audio processor TOS1 for producing an intermittent, time compressed voice signal VSS1 from a voice signal VMQ1 which has been generated by removing with a band-limit filter LPFQ a high frequency band from a voice signal VW1 received through a microphone MIC1, and an adder MU1 for summing two signals fed from TDG1 and TOS1 and transmitting a resultant sum signal to a modulator MODQ1. The receiver of a slave station contains, in addition, a sync processor RDS2 for processing the sync tone signal TWQ, which is separated from a detection signal detected by a detector DEMOD2, from a received signal which is transmitted from an antenna ANT1 of the master station to an antenna ANT2 of the slave station, an audio processor ROS2 for processing a voice signal VSS2, and a switch circuit SWQ for distributing a corresponding signal to RDS2 or ROS2 upon switching at a proper timing.

Accordingly in the master station, an original voice sound VMQ1 denoted in the row ① of a timing chart of FIG. 1 is divided by a unit of time TQ3 (e.g. of 395 msec) with the audio processor TOS1 and each resultant unit signal is time compressed to ½.5 for producing an intermittent compressed signal VSS1.

The intermittent signal VSS1 is then combined in the adder MU1 with the sync tone signal TWQ fed from the sync generator TDG1 to a modulated signal shown in the row ④ of FIG. 1. The modulation signal is further transferred across the modulator MODQ1 to a high-frequency transmitter TQ1 and emitted from the antenna ANT1 in the form of an electromagnetic wave.

In the transmitter section of the master station, the unit time TQ3 (of 395 msec) is a sum of a transmission period TSQ1 (e.g. of 210 msec denoted in the row ②, equal to TQ2) and a reception period RSQ1 (e.g. of 185 msec denoted in the row 3, equal to TQ1). As the master and slave stations are synchronized with each other, described later, those transmission and reception periods are converted to a reception period (TQ2 of the row ⑥) and a transmission period (TQ1 of the row ⑧) respectively in the slave station.

Also, a time interval Tb (of 5 msec) is commonly provided between each receiving period TQ1 and a sync tone signal period Ta (e.g. of 25 msec).

In operation of the slave station, the transmitting signal is received, transferred across the high-frequency receiver RQ2, and detected by the detector DEMOD2 where a sum signal TWQ+VSS1 shown in the row ④ of FIG. 4 is picked up. Through switching action of the switch SWQ, the sync tone signal TWQ from the sum signal is transferred to the sync processor RDS2 which in turn delivers a timing point pulse CUQ2 for allowing the phase of time dividing pattern of the slave station to coincide with that of the master station so that a sync signal of the slave station can be synchronized with that of the master station. Also, a control signal is supplied to the audio processor ROS2 where each intermittent compressed signal VSS1 is expanded 2.5 times and bound with one another to reproduce a voice signal VS2 shown in the row ⑦ of FIG. 1. Then, a quasi high-frequency component signal VHQ is added to the voice signal VS2 forming a natural-sound voice signal VSX2 which is in turn fed to a loudspeaker SP2 for sound reproduction.

Although further detailed illustrations are not shown, a voice signal picked up by a microphone of the slave station is also time divided and each is compressed to ½.5 for producing an intermittent compressed signal VSS2 shown in the row ⑨ of FIG. 1 in the same manner as of the slave station. (In general, the rate of expansion of a signal (from slave to master) in response to the compression needs not to match the expansion of a signal from master to slave. More specifically, it is non of the substantial requirements that a period TS1 shown in the row ④ is equal to a period TS2 shown in the row ⑨. The switching action for differentiating between two is thus controlled through determining with a controller CTR whether the transmitter-receiver is used as the master or slave station. The intermittent signal is emitted during the transmission period TSQ2, shown in the row ⑧, of the slave station and received by the master station during the reception period RSQ1 shown in the row ③. It is then demodulated (through detection, expansion, and rebinding) to a voice signal VS1, shown in th ⑩ section, which is in turn transferred to a loudspeaker for sound reproduction. The transmission signal emitted from the slave station contains non of a tone signal such as TWQ which is not needed. Accordingly, the arrangement shown in FIG. 3 will produce no sync tone signal from the sync generator TDG when serving as the receiver.

This switching action is also controlled by identifying with the controller CTR the role as a master or slave station.

It is common that a tone signal is provided for synchronizing action. Such a sync tone signal is a monodirectional sine wave, denoted by DT1 in FIG. 8-b, which is produced from a square-wave of FIG. 8-a developed in a digital circuit and thus, the extraction of a timing point pulse from the sync tone signal will be troublesome more or less.

This is explained by that the sine wave signal DT1 passes across a filter and other demodulating circuits during the demodulation in the reception side and thus, carries gradual "sag" portions 13Q and 14Q at both the front and rear ends as shown in FIG. 8-c. The presence of the "sag" portions makes it difficult to determine the location of a timing point pulse to be extracted in the sine-wave signal of FIG. 8-c. Because the duplex operating radio communication requires accurate synchronizing action, it is found through experiments that the assignment and extraction of a timing point pulse becomes more troublesome.

According to this embodiment, this problem is solved by, as illustrated in FIG. 9, designating as the timing point CUQ2 a joint cc (actually, an n-th joint in the signal) between two adjacent different-frequency portions DT1 and DT2 (actually, any of two's) of the tone signal or preferably, a location (at a phase angle of 720° in FIG. 9-c) displaced by a given degree of phase from the joint cc.

As the result, the joint cc exhibits no "sag" in the amplitude unlike the portions 13Q and 14Q and the timing point pulse CUQ2 can be extracted with higher accuracy at the reception side.

The timing point pulse CUQ2 shown in the row 5 of FIG. 1 is allocated and extracted in this manner.

The dividing point in the original voice signal VMQ1 at the master station shown in the row ① of FIG. 1 is arranged not to coincide with either the rise or decay of the transmission period TSQ1.

The time separation between the rise and decay is controlled by the controller CTR shown in FIG. 3. Also, the controller CTR determines the time location of both the sync tone signal TWQ and the intermittent, compressed voice signal VSS1 of the row ④ of FIG. 1 and also, the distance between the two signals in relation to the dividing point in the original voice signal for controlling the transmission and reception of signals between the master and slave stations.

Furthermore, the synchronization of a sync signal of the slave station with that of the master station using the timing point pulse CUQ2 is carried out by the controller CTR.

As shown in FIG. 3, the dotted line extending from the controller CTR indicates exchange of various data and control signals for execution of the control actions.

Embodiment 6

A further drawback to be eliminated will be explained.

If the mutual communications with the use of one single frequency between two, master and slave, desired stations among a large number of different stations, with no interference from any third station, or the selection of a slave station (receiver) by the master station (transmitter) is not guaranteed, message from the master station will be intercepted by plural slave stations causing a mess in the communication.

Techniques of using a sequence or combination of plural tone signals for selectively calling for a desired slave station have been introduced and employed for use with telephones. Those techniques may be used in the duplex voice communication radio transmitter-receiver of the present invention with equal success.

In practice, while the n-th joint of adjoined different-frequency tone signal components DT1, DT2, . . . or the location displaced by a given degree of phase angle from the joint is designated as the timing point as described in Embodiment 3, the tone signal components are grouped in a sequential or combination form for conveying a piece of information which is used for selecting and calling for a desired slave station in a conventional technique. It is also understood that the selecting and calling action is appropriate to automatic implementation of wanted tasks in the transmitter-receiver without difficulty.

The assignment, inclusion, and extraction of a timing point pulse disclosed in Embodiments 3 and 4, as well as the selection and calling of a desired slave station with the use of a sequence or combination of tone signals, will be employed with equal success for processing the digital form of a modulated voice or data signal other than the analog form.

Embodiment 7

A novel technique residing in the present invention will now be described in conjunction with the previously illustrated representations of FIGS. 1 and 4 and referring to FIG. 5. This technique is essential for smooth, not delaying duplex operating radio communications.

Each divided segment of the voice signal VMQ1 shown in the row 1 of FIG. 1 is digitalized by an A/D converter ADC controlled with a controller CTR and transferred to a random access memory RAM for storage, as portrayed in FIG. 4. After a writing duration of TQ2/TQ3 (commonly, a half of TQ2), the storage signal is read out from RAM at a speed of TQ3/TQ1 times the writing speed and transferred to a D/A converter DAC. The reading of the storage signals will be completed just after the end of a dividing period.

A resultant series of the signals becomes the intermittent, compressed voice signal VSS1 as illustrated in the row 4 of FIG. 1.

This embodiment is different from the prior art in the start and end of storage signal reading. The reading of storage signals in the prior art is determined to commence after the end of the writing.

In a slave station, the intermittent, compressed voice signal VSS picked up from a detected signal received from the master station is transferred across a filter AALPF and an A/D converter ADC to a random access memory RAM for storage as best shown in FIG. 5. Similarly, the reading of each storage signal segment start at a speed of TQ1/TQ3 just after the start of a writing period and will end before the start of reading a succeeding segment of the intermittent, compressed signal VSS. As the result, the demodulated signal VS2 shown in the row ⑦ of FIG. 1 is obtained.

A difference of the embodiment from the prior art resides in the start of a reading period. In the prior art, the reading of a storage signal starts after the completion of writing.

Figure 11:
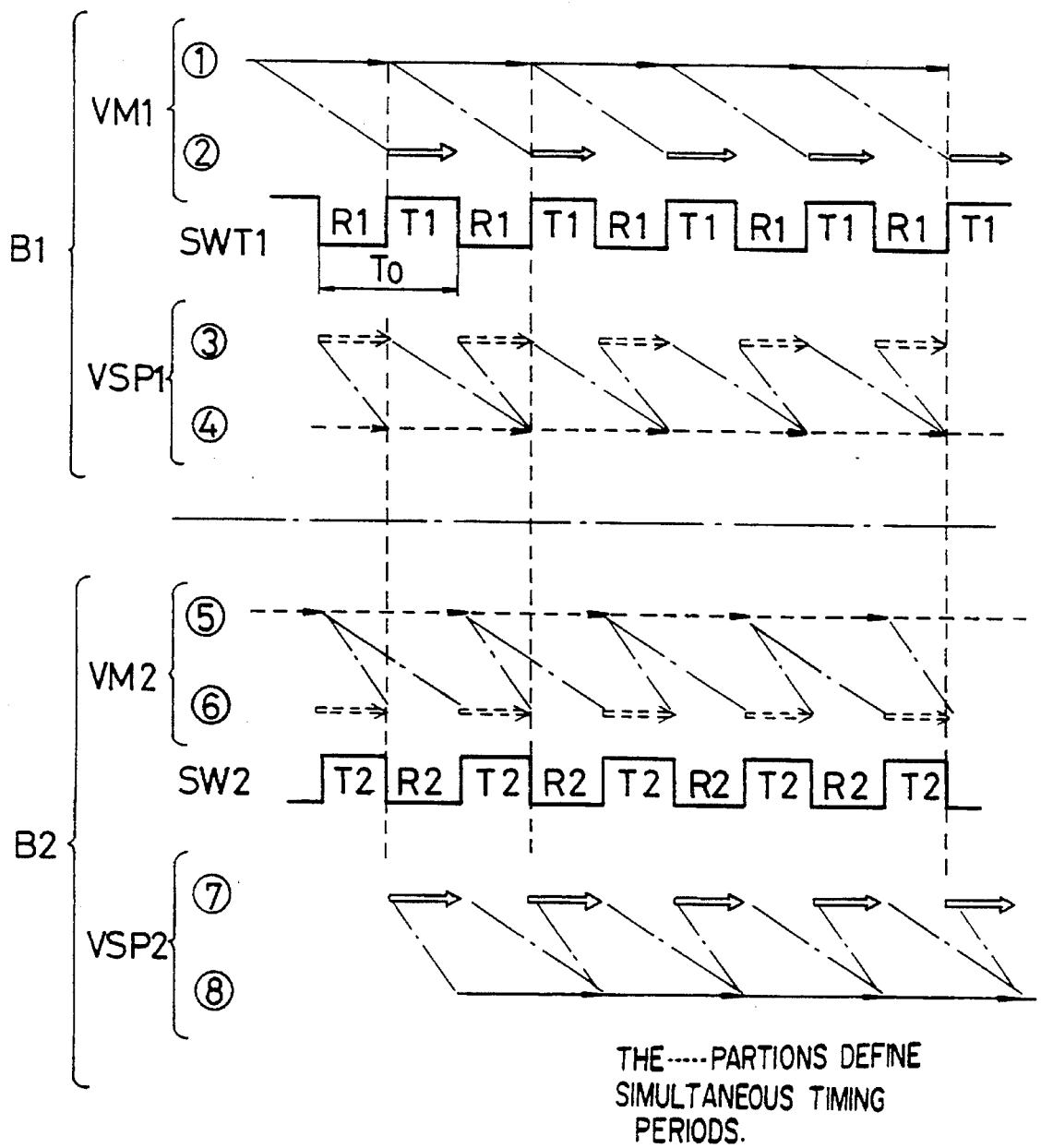
FIG. 11 is a time chart showing the exchange of the same radio signals.
Figure 12:
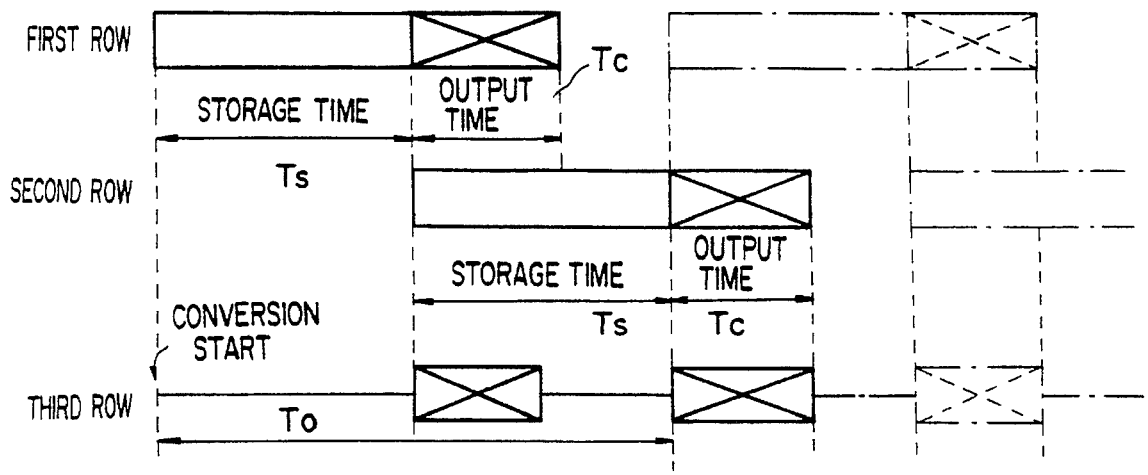
FIG. 12 is a time chart explaining time division and time compression of the same signals.
Figure 13:
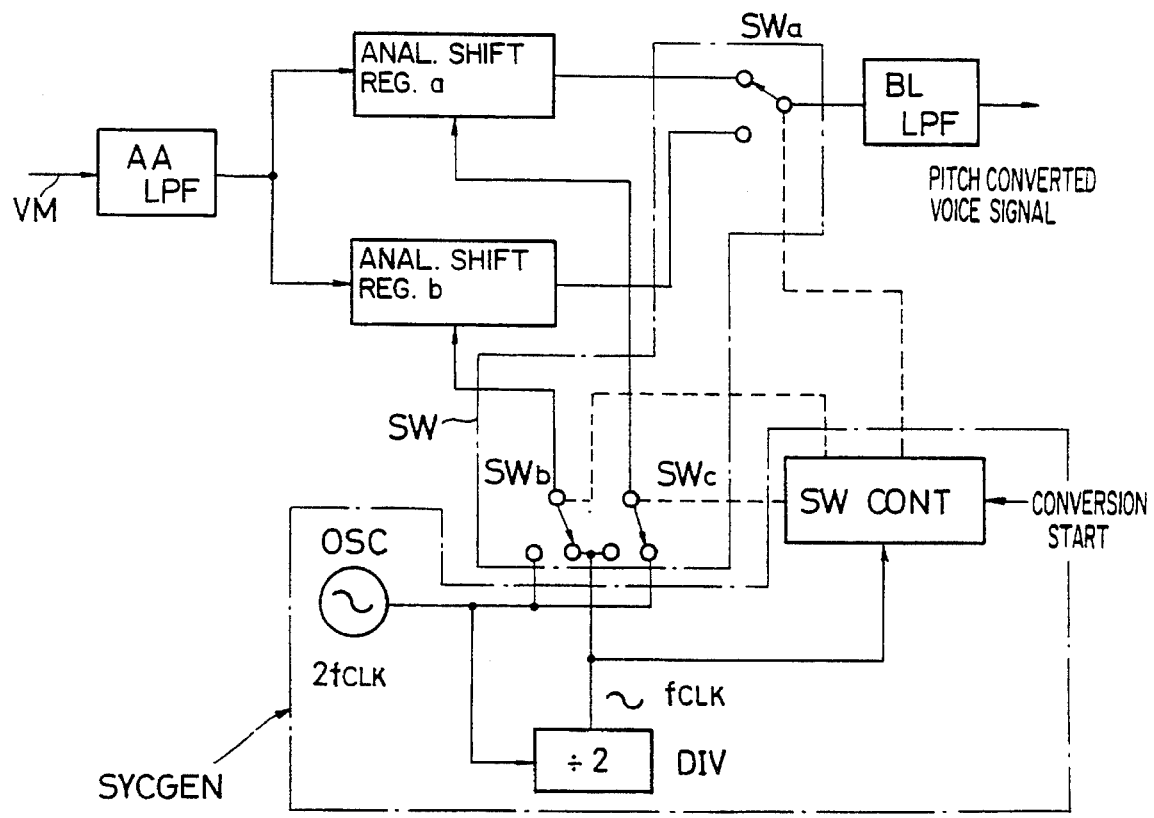
FIG. 13 is a block diagram showing an analog procedure of the operation explained in FIG. 12.

It is apparent from the comparison between FIG. 1 illustrating the present invention and FIG. 11 showing the prior art that the delay in a voice signal is decreased. While the signal delay equals about a 1.5 unit as shown in FIG. 11, the voice signal shown in the row ① of FIG. 1 is turned to the reproduced voice signal of the row ⑦ with time delay of only about a 0.5 unit.

This technique of reducing the signal delay, which is the principle of Embodiment 7, will also be employed with equal success for improving the transmission of digital signals other than analog signals of voice message.

Although the embodiments of the present invention are described with reference to transmission of voice message, they will equally be applied to transmission of data information.

We claim:

1. A duplex voice communication radio transmitter-receiver for use with a radio wave of one single frequency or two adjacent frequencies, comprising:

a master station and a slave station each having a transmitter unit and a receiver unit having the same functions;

each of said master station and said slave station including:

a pattern generator for causing the transmitting duration and the receiving duration to be reverse to each other in the time-division pattern between the master and slave station, and a composite tone signal generator for producing a composite tone signal consisting of a plurality of different frequency tone signals which are continuous and have timing points to match the time-division patterns in phase;

each of said transmitter units including:

a time-division device for time dividing a voice signal into a series of voice signal segments, a time compression device for time compressing the voice signal segments to produce an intermittent voice signal, and a modulator device for modulating a carrier with the intermittent signal to an intermittent radio waveform which is then transmitted; and each of said receiver units including:
- a time expansion device responsive to the intermittent radio waveform for reconstructing the intermittent voice signal and time expanding it to a series of the voice signal segments, and
- a device for converting the voice signal segments back to the original voice signal by binding synchronization with the time-division pattern;

said master station adapted for modulating the carrier by adding the composite tone signal to the time-compressed intermittent voice signal; and said slave station adapted for intercepting the radio waveform, separating the composite tone signal from the radio waveform to extract the intermittent voice signal, time expanding the intermittent voice signal to a series of the voice signal segments at the timing points of the composite tone signal, and converting the voice signal segments back to the original voice signal by binding in synchronization with the time-division pattern.

2. A duplex voice communication radio transmitter-receiver according to claim 1, wherein the transmitter includes a low-pass filter before the time compression device for eliminating a high range of frequencies of the voice signal.

3. A duplex voice communication radio transmitter-receiver according to claim 2, wherein the receiver includes a device for producing from a demodulated form of the voice signal a quasi high frequency component equivalent to the range of high frequencies eliminated in the transmitter and mixing it with the demodulated voice signal.

4. A duplex voice communication radio transmitter-receiver according to claim 3, wherein the device for producing a quasi high frequency component comprises a unit for generating a distortion signal by cutting off an excess of the amplitude of the demodulated voice signal exceeding a predetermined threshold, a unit for band limiting the distortion signal, and a unit for varying the amplitude of the band limited signal relative to the amplitude of the demodulated voice signal.

5. A duplex voice communication radio transmitter-receiver according to claim 3, wherein the device for producing a quasi high frequency component comprises a unit for generating a distortion signal by subjecting the demodulated voice signal to a non-linear circuit, a unit for band limiting the distortion signal, and a unit for varying the amplitude of the band limited signal relative to the amplitude of the demodulated voice signal.

6. A duplex voice communication radio transmitter-receiver according to claim 1, wherein a desired one of the slave stations is selectively called by means of a combination of the different tone signals.

7. A duplex voice communication radio transmitter-receiver according to any of claims 1 to 6, wherein the time compression device comprises:
- an A/D converter for converting the voice segments into a digital signal;
- a write device for writing said digital signal A/D converted from the voice signal into a memory;
- a read device for reading the digital signal from the memory and time compressing the digital signal as starting from when the writing has been executed just a half the time-divided segment; and
- a D/A converter for converting the time-compressed digital signal to the intermittent voice signal in the time-compressed form, and the time expansion device comprises:
- a write device for writing a digital signal A/D converted from the time-compressed intermittent voice signal into a memory;
- a read device for reading the digital signal from the memory and time expanding the digital signal just after starting the writing of the time-divided segment; and
- a D/A converter for converting back the digital signal to a series of the voice signal segments.

8. A duplex voice communication radio transmitter-receiver according to any of claims 1 to 6, wherein a timing point is designated by the phasic location of the second tone signal of the different tone signals.

9. A duplex voice communication radio transmitter-receiver according to any one of claims 1 to 6, wherein F0 is the frequency of switching by the time division pattern between the transmitting duration and the receiving duration, and ranges from 1 Hz to 10 Hz.

10. A duplex voice communication radio transmitter-receiver according to any one of claims 1 to 6, said duplex voice communication radio transmitter-receiver operating according to the expression F0<30·f/800, where f is the frequency of the radio waveform in MHz, and F0 is the frequency of switching between the transmitting duration and the receiving duration.

\* \* \* \* \*